US010376988B2

(12) United States Patent
Aoki (10) Patent No.: US 10,376,988 B2
(45) Date of Patent: Aug. 13, 2019

(54) LASER PROCESSING ROBOT SYSTEM AND LASER PROCESSING METHOD (71) Applicant: FANUC CORPORATION, Yamanashi (JP)

(72) Inventor: Toshimichi Aoki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 69 days.

(21) Appl. No.: 15/673,890

(22) Filed: Aug. 10, 2017

(65) Prior Publication Data
US 2018/0043471 A1 Feb. 15, 2018

(30) Foreign Application Priority Data

Aug. 12, 2016 (JP) .................. 2016-158576

(51) Int. Cl.
B23K 26/08 (2014.01)
B23K 26/03 (2006.01)
B25J 9/16 (2006.01)
G05B 19/408 (2006.01)
B23K 26/082 (2014.01)

(52) U.S. Cl.
CPC ........ B23K 26/0884 (2013.01); B23K 26/032 (2013.01); B23K 26/082 (2015.10); B25J 9/1671 (2013.01); B25J 9/1692 (2013.01); G05B 19/4083 (2013.01);
(Continued)

(58) Field of Classification Search
CPC .............. B23K 26/0884; B23K 26/032; G05B 19/4083; G05B 2219/36146; G05B 2219/40311; G05B 2219/45104; B25J 9/1692
See application file for complete search history.

(56) References Cited

U.S. PATENT DOCUMENTS 4,998,260 A * 3/1991 Taniura ................ B23K 26/043
356/141.3
5,034,618 A * 7/1991 Akeel .................. B23K 26/043
250/559.33
(Continued)

FOREIGN PATENT DOCUMENTS

CN 1939642 A 4/2007
CN 101396769 A 4/2009
(Continued)

Primary Examiner — Geoffrey S Evans
(74) Attorney, Agent, or Firm — RatnerPrestia (57) ABSTRACT A laser processing robot system and a laser processing method, by which the motion accuracy of a robot in the system can be improved and laser processing with high accuracy can be carried out. The robot system is configured to: execute a first robot motion for moving an laser irradiation device to a predetermined command position; measure an actual three-dimensional position of the irradiation device in the first robot motion; calculate a deviation between the command position and the measured actual three-dimensional position of the irradiation device in the first robot motion; store the calculated deviation as a time series of deviation data; and execute a second robot motion in which a robot motion similar to the first robot motion is executed while correcting the laser irradiation position so that the laser irradiation position coincides with a desired position, based on the stored deviation data.

6 Claims, 4 Drawing Sheets (52) U.S. Cl.
CPC .............. *G05B 2219/36416* (2013.01); *G05B 2219/40311* (2013.01); *G05B 2219/45104* (2013.01)

(56) References Cited

U.S. PATENT DOCUMENTS

| | | | | |
|---|---|---|---|---|
| 5,302,802 | A | * 4/1994 | Fujinaga | B23K 26/0884 |
| | | | | 219/121.74 |
| 5,887,122 | A | * 3/1999 | Terawaki | B23K 9/1274 |
| | | | | 700/258 |
| 7,904,202 | B2 | * 3/2011 | Hoppe | B25J 9/1692 |
| | | | | 700/245 |
| 8,965,556 | B2 | 2/2015 | Oe et al. | |
| 9,098,077 | B2 | * 8/2015 | Nagaoka | G05B 19/19 |
| 9,457,469 | B2 | * 10/2016 | Hazan | B25J 9/1671 |
| 2004/0093119 | A1 | * 5/2004 | Gunnarsson | B25J 9/1638 |
| | | | | 700/245 |
| 2004/0193293 | A1 | 9/2004 | Watanabe et al. | |
| 2005/0102060 | A1 | 5/2005 | Watanabe et al. | |
| 2010/0174407 | A1 | * 7/2010 | Fukawa | B23K 26/04 |
| | | | | 700/245 |
| 2010/0305757 | A1 | * 12/2010 | Sonner | B23K 26/02 |
| | | | | 700/262 |
| 2015/0105905 | A1 | * 4/2015 | Nishida | B25J 9/1641 |
| | | | | 700/254 |
| 2016/0259318 | A1 | 9/2016 | Vogt et al. | |
| 2017/0157770 | A1 | * 6/2017 | Lundberg | B25J 9/1692 |

FOREIGN PATENT DOCUMENTS

| | | |
|---|---|---|
| CN | 201632765 U | 11/2010 |
| CN | 102728953 A | 10/2012 |
| DE | 102014101568 A1 * | 8/2015 |
| DE | 102014008265 B3 * | 9/2015 |
| JP | H04098402 A | 3/1992 |
| JP | H06328283 A | 11/1994 |
| JP | 2004299010 A | 10/2004 |
| JP | 2005138223 A | 6/2005 |
| JP | 2007-098416 | 4/2007 |
| JP | 2009022970 A | 2/2009 |
| JP | 2011177731 A | 9/2011 |
| JP | 2012-139711 | 7/2012 |
| JP | 2012-218029 A * | 11/2012 |
| JP | 2016535682 A | 11/2016 |

* cited by examiner

| i: | X, | Y, | Z |
|---|---|---|---|
| 1: | 0.1 | 0.001, | 0.02 |
| 2: | 0.2 | −0.001, | 0.03 |
| 3: | 0.1 | 0.001, | 0.02 |
| : | : | : | : |
| Max | 0.2, | 0.001, | 0.03 |

[UNIT : mm]

FIG. 8

LASER PROCESSING ROBOT SYSTEM AND LASER PROCESSING METHOD

BACKGROUND OF THE INVENTION

1. Field of the Invention

The present invention relates to a robot system for carrying out laser processing by using a robot having a laser irradiation device, and a laser processing method using the robot system.

2. Description of the Related Art

As a system for carrying out laser processing by using a laser irradiation device, a laser processing robot system using a robot is well known. For example, JP 2007-098416 A discloses a laser welding device including: a robot; a laser irradiation means attached to the robot and adapted to irradiate a laser beam; a measurement means for measuring a current position of the robot; and a control means for controlling a direction of the laser beam irradiated from the laser irradiation means based on the current position measured by the measurement means, so that an irradiated position of the laser beam coincides with a predetermined position.

Further, JP 2012-139711 A discloses a laser processing unit including: a robot having a front end to which a laser scanner is attached; and a controller having a robot control system and a laser scanner control system.

In the technique of JP 2007-098416 A or JP 2012-139711 A, the laser irradiation device for irradiating the laser beam is attached to the front end of the robot arm, so that the laser irradiation device carries out welding, cutting or piercing, etc., by moving the robot arm and changing the irradiation direction of the laser beam from the laser irradiation device. The laser processing as such is also referred to as a remote laser, since the distance between the workpiece and the laser irradiation device is relatively large.

In the remote laser, the processing with high accuracy can be carried out, whereas the processing accuracy thereof depends on the motion accuracy of the robot, since the laser irradiation device is attached to the robot. For example, although JP 2007-098416 A discloses a means for correcting the irradiation position while measuring a three-dimensional position of the robot gripping the irradiation device in real-time, a control delay may occur in the real-time correction. In addition, it is necessary that the system always has a measurement device, and the same number of measurement devices as the systems are necessary. Further, if the measurement device has a trouble during use of the system, the irradiation position cannot be corrected.

On the other hand, the technique of JP 2012-139711 A is intended to avoid the control delay as in JP 2007-098416 A by previously simulating the robot motion. However, the simulation usually includes a certain level of error, and thus the error may deteriorate the processing accuracy.

SUMMARY OF THE INVENTION

An object of the present invention is to provide a laser processing robot system and a laser processing method, by which the motion accuracy of a robot in the system can be improved and laser processing with high accuracy can be carried out.

Accordingly, one aspect of the present invention provides a robot system for carrying out laser processing of an object to be processed by irradiating a laser beam onto a predetermined position of the object, the robot system comprising: a robot having a movable section; a laser irradiation device having a variable mechanism configured to change a laser irradiation position with respect to at least one direction; a first robot motion executing section configured to execute a first robot motion in which the laser irradiation device is moved to a predetermined command position; a device position measuring section configured to measure an actual position of the laser irradiation device in a three-dimensional space in the first robot motion; a deviation storing section configured to calculate a deviation between the command position and the actual position in the three-dimensional space of the laser irradiation device measured by the device position measuring section in the first robot motion, and store the calculated deviation as a time series of deviation data; a laser irradiation position correcting section configured to correct the laser irradiation position so as to coincide with a desired position, based on the deviation data stored in the deviation storing section; and a second robot motion executing section configured to execute a second robot motion in which a robot motion similar to the first robot motion is executed while the laser irradiation position is corrected by the laser irradiation position correcting section.

The robot system may further comprise a device performance determining section configured to, when the variable mechanism of the laser irradiation device is controlled, determine as to whether or not operation performance of the variable mechanism has a predetermined margin.

The robot system may further comprise: a motor information comparing section configured to compare first feedback information of a rotation velocity or a torque of a motor of each axis of the robot in the first robot motion and second feedback information of a rotation velocity or a torque of the motor of each axis of the robot in the second robot motion; and a judging section configured to judge that the correction of the laser irradiation position is invalid when a difference between the first and second feedback information obtained by the motor information comparing section exceeds a predetermined allowable value.

Another aspect of the present invention provides a laser processing method for carrying out laser processing of an object to be processed by irradiating a laser beam onto a predetermined position of the object, by using a robot having a movable section and a laser irradiation device having a variable mechanism configured to change a laser irradiation position with respect to at least one direction, the method comprising the steps of: executing a first robot motion in which the laser irradiation device is moved to a predetermined command position; measuring an actual position of the laser irradiation device in a three-dimensional space in the first robot motion; calculating a deviation between the command position and the measured actual position in the three-dimensional space of the laser irradiation device in the first robot motion; storing the calculated deviation as a time series of deviation data; and executing a second robot motion in which a robot motion similar to the first robot motion is executed while correcting the laser irradiation position so that the laser irradiation position coincides with a desired position, based on the stored deviation data.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
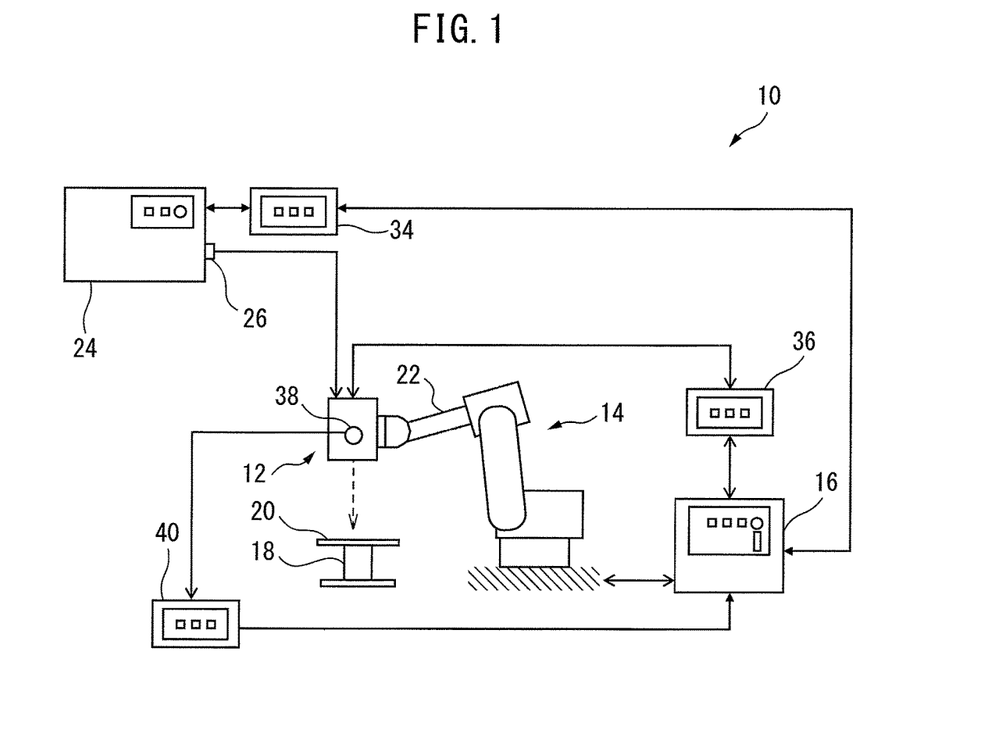
FIG. 1 shows an example of a configuration of a laser processing robot system according to a preferred embodiment of the present invention.

FIG. 1 shows an example of a configuration of a laser processing robot system 10 according to a preferred embodiment of the present invention. Robot system 10 has: a laser irradiation device 12 having a variable mechanism (as explained below) configured to change a laser irradiation position with respect to at least one direction; and a robot 14 to which laser irradiation device 12 is mounted; and a robot controller 16 configured to control robot 14. Robot system 10 is configured to carry out predetermined laser processing (or machining) such as cutting, welding or marking, by irradiating a laser beam onto a predetermined position of an object to be processed (or a workpiece) 20 held by or located on a working table 18.

For example, robot 14 is a multi-joint robot having six axes, and having a movable section 22 such as a robot arm. Robot 14 is configured to move irradiation device 12 attached to a front end of robot arm 22 to an arbitrary position within a working space.

Laser irradiation device 12 has an irradiation port 26, and is configured to output a laser beam which is input from a laser light source 24, from irradiation port 26. Laser irradiation device 12 may include, as a variable mechanism of the laser irradiation position, at least one of a lens mechanism (not shown) capable of arbitrarily changing a focal length of the laser beam and a galvano mechanism 28 capable of arbitrarily changing an irradiation direction of the laser beam, as exemplified in FIG. 2.

Figure 2:
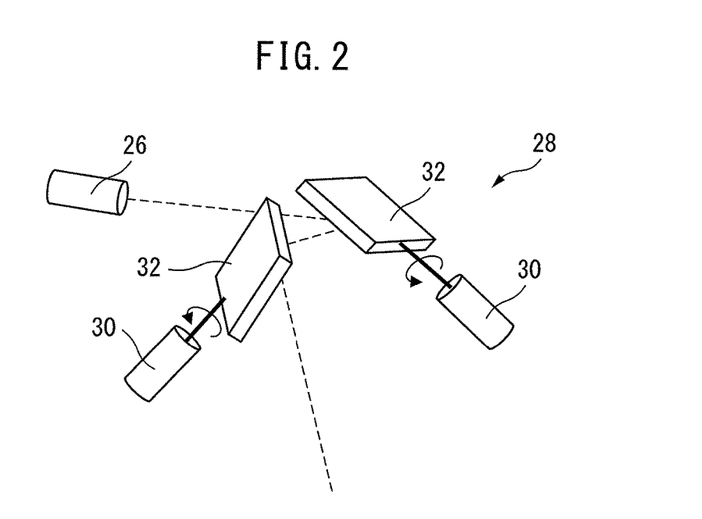
FIG. 2 shows a schematic configuration of a galvano mechanism included in a laser irradiation device.

As shown in FIG. 2, galvano mechanism 28 has at least one pair (in the drawing, two pairs) of galvano motor 30 and mirror 32. Concretely, mirror 32 is attached to a front end of each galvano motor 30, and a reflection angle of the incident laser beam from laser light source 24 can be arbitrarily changed by adjusting a rotation angle of galvano motor 30. As shown, by using two pairs of galvano motor 30 and mirror 32, the laser irradiation position on a plane can be arbitrarily adjusted.

In the embodiment, laser light source 24 supplies the laser beam to laser irradiation device 12, and concretely, is a laser oscillator for carrying out laser oscillation. As a type of a laser oscillated by the laser oscillator, a fiber laser, a $CO_2$ laser, or a YAG laser may be used. However, the other type of laser may also be used.

Robot controller 16 controls the motion of robot 14 by generating a command for controlling robot 14 based on a predetermined operation program. As shown in FIG. 1, robot system 10 may have a laser light source controller 34 for controlling laser light source 24, and robot controller 16 may transmit a command regarding the laser irradiation to laser light source controller 34. Concretely, the command from robot controller 16 to laser light source controller 34 may include a power, a frequency and/or a duty, which correspond to a laser irradiation condition. Alternatively, a plurality of laser irradiation conditions may be stored in a memory, etc., contained in laser light source controller 34, and the command from robot controller 16 may include an instruction as to which condition in the memory should be used, and an instruction regarding a timing of start and end of laser irradiation. Although robot controller 16 and laser light source controller 34 are illustrated as devices separated from each other in FIG. 1, (the function of) laser light source controller 34 may be incorporated in robot controller 16.

As shown in FIG. 1, robot system 10 may have a laser irradiation device controller 36 configured to control laser irradiation device 12 (concretely, adjust the position of the lens or the mirror within a structure of laser irradiation device 12). Although robot controller 16 and laser irradiation device controller 36 are illustrated as devices separated from each other in FIG. 1, (the function of) laser irradiation device controller 36 may be incorporated in robot controller 16.

Robot system 10 may have a three-dimensional position detection element 38 attached to the front end of robot arm 22 or laser irradiation device 12, and configured to measure the actual (three-dimensional) position of the laser irradiation device 12 in the three-dimensional space. As an example of three-dimensional position detection element 38, a GPS (global positioning system) or a gyro sensor may be used. Although position detection element 38 is connected to a three-dimensional position measurement device 40 (explained below) by a wire in FIG. 1, position detection element 38 may be connected to device 40 by radio. As an example of another device for measuring the laser irradiation position, a three-dimensional position measurement system using a laser tracker may be used. In this case, a light receiving element to be used for the laser tracker is fixed to the front of robot arm 22 or laser irradiation device 12. In addition, the attachment position of detection element 38 may be previously calibrated relative to the position of the front end of the robot arm (e.g., a tool center point).

Robot system 10 may have a three-dimensional position measurement device 40 connected to position detection element 38 by a wire or radio, and in the embodiment, three-dimensional position measurement device 40 and position detection element 38 constitute the device position measuring section. Three-dimensional position measurement device 40 is configured to calculate the (three-dimensional) position of laser irradiation device 12 in the three-dimensional space based on data obtained from three-dimensional position detection element 38, and transmit the calculated positional data to robot controller 16. Although robot controller 16 and three-dimensional position measurement device 40 are illustrated as devices separated from each other in FIG. 1, (the function of) three-dimensional measurement device 40 may be incorporated in robot controller 16. Alternatively, when a body of three-dimensional position measurement device 40 is relatively small and is integrated (or unitized) with position detection element 38, the unitized device may be fixed to the front end of the robot arm or the laser irradiation device.

In the embodiment, the functions of the first robot motion executing section, the second robot motion executing section, the motor information comparing section and the judging section as described above may be provided to robot controller 16 (e.g., a CPU thereof). Further, the function of the deviation storing section may be provided to a memory of robot controller 16 or laser irradiation device controller 36, and the functions of the laser irradiation position correcting section and the device performance determining section may be provided to laser irradiation device controller 36 (e.g., a CPU thereof).

Figure 3:
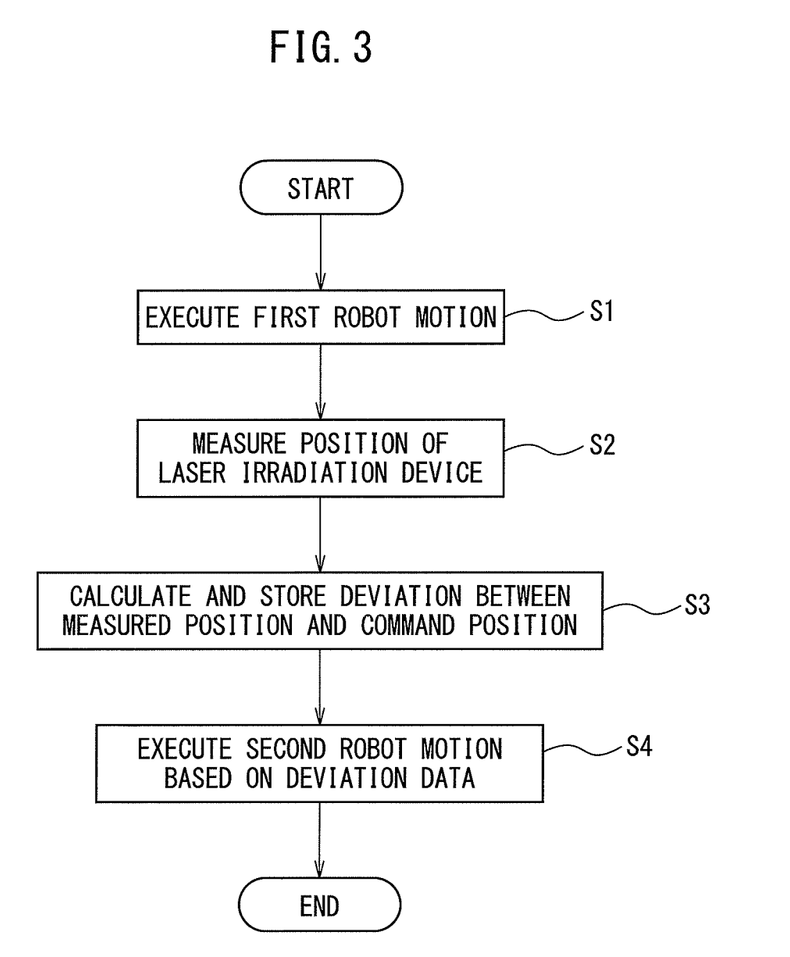
FIG. 3 is a flowchart showing an example of a procedure in the robot system of FIG. 1.

Next, an example of the laser processing method by robot system 10 (concretely, a process for moving laser irradiation device 12 to a predetermined working point by using robot 14, and irradiating the laser beam), with reference to a flowchart of FIG. 3. In this case, FIG. 4 explains that, in a coordinate system Ow defined in a robot working space, during robot 14 is linearly moved from point A to point B, the laser beam is similarly irradiated from point A to point B.

Figure 4:
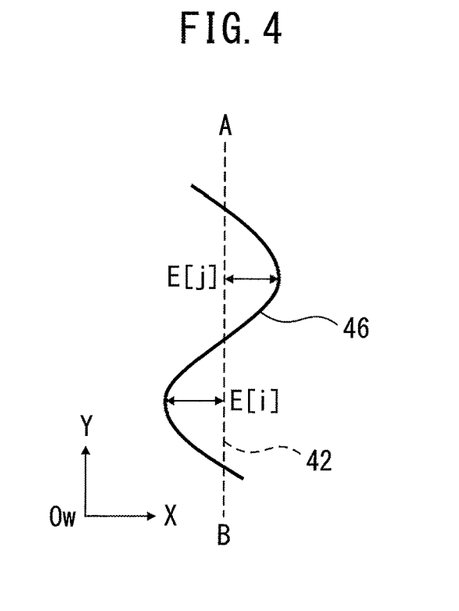
FIG. 4 shows an example of a trajectory of positions of the laser irradiation device in a coordinate system defined with respect to a robot.
Figure 5:
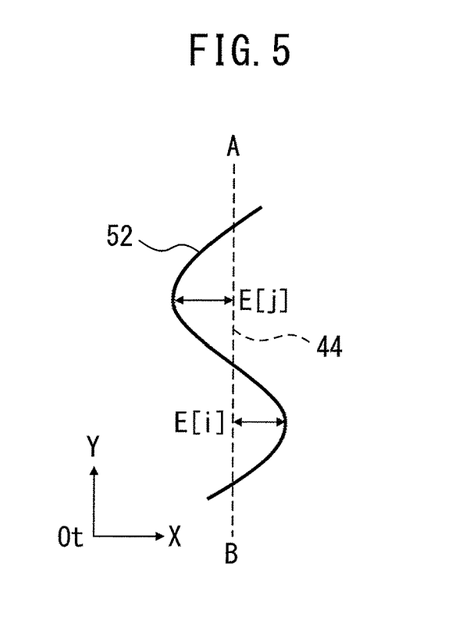
FIG. 5 shows an example of a trajectory of laser irradiation positions in a coordinate system defined with respect to the laser irradiation device.

First, based on a predetermined program, the first robot motion (i.e., the process for moving irradiation device 12 attached to robot arm 22 is moved toward a predetermined command position (in this case, from point A to point B) without irradiating the laser beam) is executed (step S1). In this regard, as shown in FIG. 4, from a viewpoint of the command, laser irradiation device 12 is moved along a trajectory corresponding to a dashed (straight) line 42 from point A to point B in coordinate system Ow. In addition, as shown in FIG. 5, in a coordinate system Ot defined with respect to the laser irradiation device, laser irradiation device 12 is controlled so as to irradiate the laser beam along a trajectory corresponding to a dashed (straight) line 44 from point A to point B, in the same time series as the first robot motion. Concretely, laser irradiation device controller 36 controls galvano mechanism 28 or the lens mechanism within irradiation device 12 for adjusting the focal point so that the laser irradiation position coincides with a predetermined position.

In fact, robot 14 may not be correctly moved along the commanded trajectory, since the robot is affected by an error due to the structure or control of the robot, such as a delay in the tracking control of a servomotor, a backlash or elastic deformation of a speed reducer, in which the servomotor and the speed reducer may be used as drive components for each axis of the robot. For example, the actual trajectory of the robot may represent a serpentine line as indicated by a solid line 46 in FIG. 4.

Figure 6:
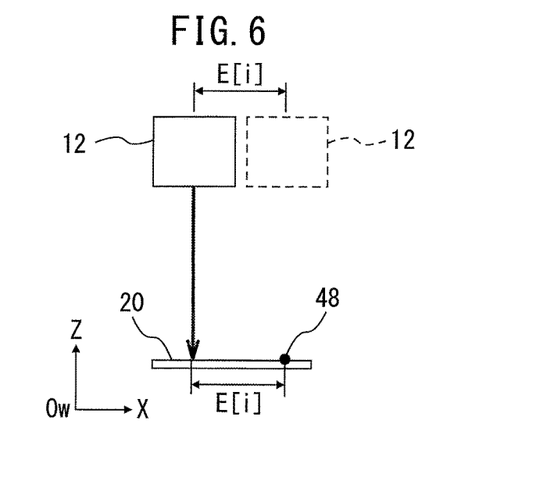
FIG. 6 shows a positional relationship between the laser irradiation device and an object to be processed at a certain time point.

FIG. 6 shows a positional relationship between laser irradiation device 12 and workpiece 20 at a certain time point i. The actual position of laser irradiation device 12 (indicated by the solid line) is deviated from the commanded position (indicated by the dashed line) by a distance corresponding to a deviation E[i], due to the error as described above. Therefore, the position of workpiece 20, onto which the laser beam is irradiated, is also deviated from a target laser irradiation position 48 by the distance corresponding to deviation E[i]. In such a case, when laser irradiation device 12 irradiates the laser beam, a laser processing line is also affected by the error of (serpentine) trajectory of the robot, and represents the serpentine line similar to solid line 46 in FIG. 4, whereby the laser processing quality may be deteriorated.

Thus, in the next step S2, during executing the first robot motion, the actual three-dimensional position of laser irradiation device 12 attached to robot 14 is measured by three-dimensional position measurement device 40 and three-dimensional position detection element 38. In this regard, a base or reference position in the measurement may correspond to the attachment position of three-dimensional position detection element 38, and the attachment position is previously calibrated relative to the position of the front end of the robot. In other words, the attachment position is previously known. As a specified portion (or a detected position) of laser irradiation device 12 to be measured, a portion of the device (e.g., laser irradiation port 26 of device 12) having a constant positional relationship relative to the attachment position of three-dimensional position detection element 38 may be used.

The position data measured (obtained) by three-dimensional position measurement device 40 and three-dimensional position detection element 38 is transmitted to robot controller 16. The data transmission may be performed in real-time in parallel with the laser irradiation. Otherwise, the position data may be stored in three-dimensional position measurement device 40 along with a synchronized clock having the time series common to robot controller 16, and then the stored data may be transmitted to robot controller 16 as the collective data over a predetermined period of time. In the latter case, since the transmitted position data is stored with the synchronized clock, the transmitted data can be easily restored as the time series data in robot controller 16.

Figure 7:
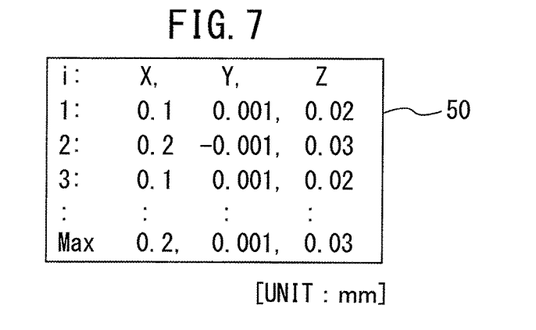
FIG. 7 shows a concrete example of deviation data.

In robot controller 16, the measured/transmitted position data and the command position of laser irradiation device 12 attached to robot 14 in the three-dimensional space are compared in the same time series so as to calculate the difference (deviation) therebetween, and the calculated deviation is stored in a suitable storing section such as a memory (step S3). Concretely, the actual measured position and the commanded position are compared at certain sampling time point i, so that deviation E[i] between the actual measured position and the commanded position is calculated, and then the calculated deviations are stored as the time series data such as E[0], E[1], E[Nmax]. In this regard, since the deviation corresponding to each time point may include respective components of the X-, Y- and Z-axes in the working space, the deviations may be stored as a data set 50 in a table form, as exemplified in FIG. 7.

The deviation data as explained above may be transmitted from robot controller 16 to laser irradiation device controller 36. Otherwise, the deviation data may be temporarily stored in the memory of robot controller 16, and then laser irradiation device controller 36 may refer to or read the content in the memory at proper or arbitrary time intervals.

In the next step S4, the second robot motion (i.e., the process for irradiating the laser beam from laser irradiation device 12 toward workpiece 20 while executing the first robot motion similar to step S1) is executed. In this regard, when galvano mechanism 28 or the lens mechanism within irradiation device 12 for adjusting the focal point should be controlled so that the laser irradiation position coincides with the predetermined position, laser irradiation device controller 36 refers to the deviation data stored in step S3, and then corrects the laser irradiation position based on the deviation data matched with the time series of the robot motion. In other words, in coordinate system Ot defined with respect to laser irradiation device 12, the laser beam is irradiated so that deviation E[i] is corrected in the same time series as the robot motion.

Figure 8:
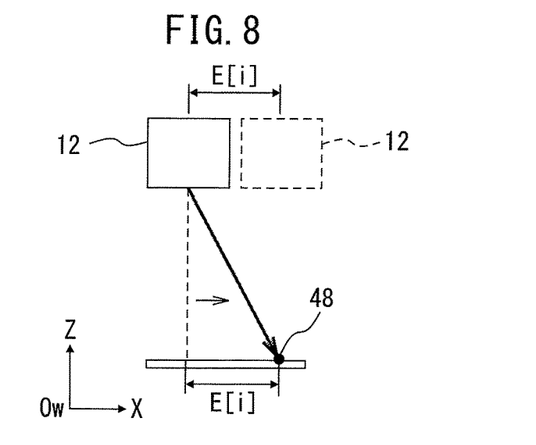
FIG. 8 shows the positional relationship between the laser irradiation device and the object at the certain time point, along with an example in which the laser irradiation position is corrected.

FIG. 8 shows the state of the laser irradiation at certain time point i, and explains an example for correcting the laser irradiation position. As shown in FIG. 6, the actual position of laser irradiation device 12 is deviated from the command position by the distance corresponding to deviation E[i]. In this case, by correcting the laser irradiation position toward target position 48 by the distance corresponding to E[i], the laser beam can be precisely irradiated onto target (desired) laser irradiation position 48.

By virtue of such correction as explained above, as, indicated by a solid line 52 in FIG. 5, in coordinate system Ot defined with respect to the laser irradiation device, the laser processing line becomes symmetrical to the solid line (or the serpentine trajectory) in FIG. 4 with respect to a straight line AB. As a result, the error due to the structure or control of the robot can be eliminated, and thus the actual laser irradiation position (or the laser processing line) becomes a trajectory along straight line AB in coordinate system Ow, whereby the precise laser processing can be carried out.

In the above embodiment, both the motion trajectory and the processing line are explained as the straight lines. However, it is obvious that the positional correction in the time series can also be applied to another trajectory or processing line each having an arbitrary shape.

Optionally, laser irradiation device controller 36 may judge or evaluate as to whether or not operation performance of the laser irradiation position variable mechanism, such as the lens mechanism or galvano mechanism 28 of laser irradiation device 12, has a predetermined margin, when device 12 is controlled in view of the above positional correction. In this case, the operation performance may include a velocity, an acceleration and a movable range of the variable mechanism for controlling the final or eventual laser irradiation position. With respect to galvano mechanism 28, the rotational velocity and acceleration of motor 30 for rotating mirror 32, and the range of rotation angle of mirror 32 may correspond to the operation performance. In the above example, laser irradiation device 12 corrects the laser irradiation position by the distance corresponding to deviation E[i]. For example, when the range where the laser beam can be irradiated is larger than deviation E[i], the difference between the range and E[i] may correspond to the above margin of the motion range, and thus is can be judged that the positional correction can be carried out even if an amount of correction is larger than E[i].

In the above example, laser irradiation device 12 is required to change the laser irradiation position by the distance corresponding to the difference between deviations E[i-1] and E[i], within a predetermined sampling period of time. Therefore, a change rate of the laser irradiation position (i.e., a movable distance of the irradiation position per each sampling period) needs to be larger than a necessary correction rate (=(E[i-1]-E[i])/(sampling period)). When the change rate is significantly larger than the necessary correction rate in the objective operation, it can be judged that the positional correction can be carried out at a high correction speed. The same is also applicable to the acceleration.

Generally, the deviation between the position in the command (or the command position) and the actual position (or the measured position) of the robot highly depends on the error due to the structure or control of the robot, such as the delay in the tracking control of the servomotor, the backlash or elastic deformation of the speed reducer, the deflection of the robot arm, etc., and thus the deviation is increased with increase in the motion velocity of the robot. As the deviation between the command position of the robot and the measured position of the robot is increased, the amount of correction required for the laser irradiation position is increased. Further, when the robot is speeded up, the necessary amount of correction per unit time (i.e., the correction velocity or correction acceleration) is also increased.

Therefore, when the operation performance is judged to have a sufficient margin, it is preferable that the motion velocity of the robot be increased at a predetermined rate, and then the above steps S1 to S3 be repeated. Then, when it is judged that the deviation calculated in step S3 can be corrected by the operation performance of laser irradiation device 12, the laser processing can be carried out while the laser irradiation position is appropriately corrected.

The above speeding-up of the robot can be carried out in a stepwise manner. For example, when the velocity of the robot before the speeding-up is 1000 mm/s and the maximum velocity of the robot is 2000 mm/s, the velocity of the robot may be increased to 1100 mm/s first, and then the margin of the operation performance of the laser irradiation device as described above may be evaluated. If the margin is still sufficient at this stage, the velocity of the robot may be increased to 1200 mm/s, and the margin of the operation performance of the laser irradiation device may be evaluated again. As such, the speeding-up of the robot and the evaluation of the margin of the operation performance may be repeated until the motion velocity of the robot reaches the upper limit (in this case, 2000 mm/s) or until it is judged that the operation performance of the laser irradiation device is not sufficient for appropriately correcting the deviation. By virtue of such a process, the laser processing can be carried out at the highest velocity of the robot within the operation performance of the laser irradiation device.

In addition, when the three-dimensional position of laser irradiation device 12 is measured, an amount of feedback of the rotation velocity and/or the torque of the motor of each axis of robot 14 during the operation of the robot may be stored. The stored feedback information may be compared to an amount of feedback of the rotation velocity and/or the torque of the motor of each axis of robot 14 during the operation of the robot for correcting the laser irradiation position. If there is a significant difference (concretely, higher than a predetermined allowable value) therebetween, it can be judged that the motion of robot 14 when measuring the three-dimensional position is different from the motion of the robot when correcting the laser irradiation position. For example, when the rotation angle of the motor is different, it can be easily judged that the position of the front end of robot 14 is also different.

In the embodiment, it is assumed that the motion of the robot when measuring the three-dimensional position of the laser irradiation device and the motion of the robot when correcting the laser irradiation position are the same. Therefore, when the amounts of feedback (first and second feedback information) of the respective (first and second) motions are significantly different from each other, it is not appropriate to use the previously obtained deviation data to correct the irradiation position. Accordingly, in such a case, it is preferable that an indicator or an alarm be used to inform the operator that the correction is invalid, so that the operator can correct a point or portion of abnormality. In addition, when the abnormality is negligible, the three-dimensional position of the laser irradiation device may be measured again so as to obtain new deviation data.

In the embodiment, by previously measuring the actual position of the robot during the processing motion so as to obtain the error between the actual position and the command robot position, the irradiation device can be controlled in view of the correction error in the actual processing (i.e., feedforward control can be carried out). Therefore, the delay in correction and/or the simulation error in the prior art can be eliminated, and thus the laser irradiation robot system with high accuracy can be constituted. In addition, since it is sufficient that the three-dimensional position is previously measured once, it is not necessary that the robot system is always provided with the measurement device. For example, when there are plural similar robot systems, one measurement device may be shared among the robot systems, whereby a total cost of the systems may be reduced. Further, since the measurement device is not used during the actual laser processing, it is not necessary to concern about a malfunction of the measurement device during the processing, and thus the reliability of the robot system may be improved.

According to the present disclosure, the positional deviation of the laser irradiation device measured during the first robot motion is executed may be used to correct the laser irradiation position in the second robot motion, whereby the laser irradiation position can be precisely corrected. Further, since it is not necessary to measure the position of the laser irradiation device during the actual processing, it is not necessary to concern about a case in which the laser irradiation position cannot be correctly measured (e.g., a malfunction of the device for measuring the laser irradiation position) during the processing motion is continuously executed, whereby the reliability of the robot system may be improved.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot system for carrying out laser processing of an object to be processed by irradiating a laser beam onto a predetermined position of the object, the robot system comprising:
    a robot having a movable section;
    a laser irradiation device having a variable mechanism configured to change a laser irradiation position with respect to at least one direction;
    a first robot motion executing section configured to execute a first robot motion in which the laser irradiation device is moved to a predetermined command position;
    a device position measuring section configured to measure an actual position of the laser irradiation device in a three-dimensional space in the first robot motion;
    a deviation storing section configured to calculate a deviation between the command position and the actual position in the three-dimensional space of the laser irradiation device measured by the device position measuring section in the first robot motion, and store the calculated deviation as a time series of deviation data;
    a laser irradiation position correcting section configured to correct the laser irradiation position so as to coincide with a desired position, based on the deviation data stored in the deviation storing section; and
    a second robot motion executing section configured to execute a second robot motion while the laser irradiation position is corrected by the laser irradiation position correcting section.

2. The robot system as set forth in claim 1, further comprising a device performance determining section configured to, when the variable mechanism of the laser irradiation device is controlled, determine as to whether or not operation performance of the variable mechanism has a predetermined margin.

3. The robot system as set forth in claim 1, further comprising:
    a motor information comparing section configured to compare first feedback information of a rotation velocity or a torque of a motor of each axis of the robot in the first robot motion and second feedback information of a rotation velocity or a torque of the motor of each axis of the robot in the second robot motion; and
    a judging section configured to judge that the correction of the laser irradiation position is invalid when a difference between the first and second feedback information obtained by the motor information comparing section exceeds a predetermined allowable value.

4. The robot system as set forth in claim 1, wherein the second robot motion is the same as the first robot motion.

5. A laser processing method for carrying out laser processing of an object to be processed by irradiating a laser beam onto a predetermined position of the object, by using a robot having a movable section and a laser irradiation device having a variable mechanism configured to change a laser irradiation position with respect to at least one direction, the method comprising:
    executing a first robot motion in which the laser irradiation device is moved to a predetermined command position;
    measuring an actual position of the laser irradiation device in a three-dimensional space in the first robot motion;
    calculating a deviation between the command position and the measured actual position in the three-dimensional space of the laser irradiation device in the first robot motion;
    storing the calculated deviation as a time series of deviation data; and
    executing a second robot motion while correcting the laser irradiation position so that the laser irradiation position coincides with a desired position, based on the stored deviation data.

6. The laser processing method as set forth in claim 5, wherein the second robot motion is the same as the first robot motion.

* * * * *